(12) United States Patent
Hanna et al.

(10) Patent No.: US 11,023,357 B1
(45) Date of Patent: Jun. 1, 2021

(54) METHOD AND SYSTEM FOR SEQUENTIAL EQUIVALENCE CHECKING

(71) Applicant: Cadence Design Systems, Inc., San Jose, CA (US)

(72) Inventors: Ayman Hanna, Karmiel (IL); Karam Abdelkader, Haifa (IL); Doron Bustan, Zichron Yaakov (IL); Habeeb Farah, Nazareth (IL); Thiago Radicchi Roque, Oakland, CA (US); Felipe Althoff, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 28 days.

(21) Appl. No.: 16/583,853

(22) Filed: Sep. 26, 2019

(51) Int. Cl.
| | |
|---|---|
| *G06F 11/36* | (2006.01) |
| *G06N 20/00* | (2019.01) |
| *G06F 30/30* | (2020.01) |
| *G06F 30/33* | (2020.01) |
| *G06F 30/333* | (2020.01) |

(52) U.S. Cl.
CPC .......... *G06F 11/3608* (2013.01); *G06F 30/30* (2020.01); *G06F 30/33* (2020.01); *G06N 20/00* (2019.01); *G06F 30/333* (2020.01)

(58) Field of Classification Search
CPC ...... G06F 11/3608; G06F 30/30; G06F 30/33; G06F 30/333; G06N 20/00
USPC ................................................ 717/124, 128
See application file for complete search history.

(56) References Cited

U.S. PATENT DOCUMENTS

| | | | | |
|---|---|---|---|---|
| 5,754,454 | A * | 5/1998 | Pixley | G06F 30/3323 702/123 |
| 7,239,996 | B2 * | 7/2007 | Boland | G06F 30/33 703/19 |
| 8,176,366 | B2 * | 5/2012 | Horley | G06F 11/3636 714/45 |
| 10,515,170 | B1 * | 12/2019 | Kundu | G06F 30/367 |
| 2002/0108093 | A1 * | 8/2002 | Moondanos | G06F 30/3323 716/107 |
| 2003/0229483 | A1 * | 12/2003 | Boland | G06F 30/33 703/19 |
| 2010/0257510 | A1 * | 10/2010 | Horley | G06F 11/3632 717/128 |
| 2019/0286782 | A1 * | 9/2019 | Nalla | G06F 30/398 |

OTHER PUBLICATIONS

Brady, B., et al., Learning Conditional Abstractions, Proceedings of the International Conference on Formal Methods in Computer-Aided Design, Oct. 2011, pp. 116-124, [retrieved on Dec. 18, 2020], Retrieved from the Internet: <URL:http://dl.acm.org/>.*

(Continued)

*Primary Examiner* — Geoffrey R St Leger
(74) *Attorney, Agent, or Firm* — Pearl Cohen Zedek Latzer Baratz LLP

(57) ABSTRACT

A method for sequential equivalence checking (SEC) of two representations of an electronic design may include using a processor, automatically selecting a plurality of cutpoints in the two representations of the electronic design; using a processor, automatically executing a prove-from strategy on the plurality of cut point pairs to identify a failed cut point pair in the two electronic designs; and using the processor, automatically extending a trace corresponding to the identified failed cut point pair to identify a deeper failed cut point pair or a failed output pair in the two electronic designs.

19 Claims, 4 Drawing Sheets

(56) References Cited

OTHER PUBLICATIONS

Vasudevan, S., et al., Automatic Decomposition for Sequential Equivalence Checking of System Level and RTL Descriptions, Proceedings of 4th ACM/IEEE International Conference on Formal Methods and Models for Co-Design, Jan. 2006, pp. 71-80, [retrieved on Sep. 6, 2019], Retrieved from the Internet: <URL:http://dl.acm.org/>.*

Huang, W., et al., Sequential Equivalence Checking Using Cuts, Proceedings of the ASP-DAC 2005. Asia and South Pacific Design Automation Conference, 2005, pp. 455-458, [retrieved on Dec. 17, 20], Retrieved from the Internet: <URL:http://ieeexplore.ieee.org/>.*

* cited by examiner

| Step | 0 | 1 | 2 |
|---|---|---|---|
| i1 | 1 | 0 | 1 |
| i2 | 1 | 0 | 1 |
| i3 | 0 | 0 | 1 |
| f1 | 0 | 1 | 0 |
| o1 | x | 0 | 0 |

METHOD AND SYSTEM FOR SEQUENTIAL EQUIVALENCE CHECKING

FIELD OF THE INVENTION

The present invention relates to formal verification. More specifically the present invention relates to method and system for sequential equivalence checking of two representations of an electronic design.

BACKGROUND OF THE INVENTION

Design verification is a common process for testing electronic designs (e.g., a newly designed integrated circuit, board, or system-level architecture), to, for example, confirm compliance with requirements that can be defined by a specification for that device.

Verification of electronic designs typically has three forms. At an early stage, before the electronic design is implemented in hardware, a first form can include a simulation that can be conducted on a model of the design. A second form can be emulation, for example, in which one electronic hardware is used to mimic the behavior of another (e.g., a tested) electronic hardware. At more advanced stages of design development, a third form can include a system on chip that is validated, for example, in a process which is typically referred to as a post-silicon verification. Post-silicon verification can be a last stage in the electronic design development, for example, before it is commercially manufactured.

Formal verification, rather than testing a design under test (DUT), is typically aimed at proving or disproving whether a logic design complies with a formal specification by, for example, using mathematics.

Typically, in a verification process of electronic designs, a particular design can be modeled in multiple model formats where each model format can be different. The multiple different models can be called representations. Each model format for the particular design can be employed in various different stages of the design development and verification of the particular design. For example, at one development stage a design may be represented in a certain language (e.g., in Register Transfer Level—RTL—format), while at another stage the same design may be represented in a gate-level format and/or netlist format.

In formal verification abstraction may be used. Abstraction can involve a determination of the particular functionality that needs to be verified and at what level of detail, such that not all of the functionality and details of a particular design (e.g., electronic design) are verified during each verification process. Abstraction can also involve abstracting areas of a design which are known to increase complexity and/or run-time, such that a simpler representation of the design or part thereof can be used during the verification instead of the entire design. For example, abstraction can involve removing some elements (e.g., electrical elements, a resistor or gate) in the design that relate to certain functionality or functionalities, while maintaining other elements that relate to other functionality or functionalities.

Employing abstraction in verification can help focus on obtaining information that is relevant in a given context, while omitting information that relates to other non-relevant contexts. In many instances, abstraction may be used (e.g., introduced by a user, or automatically) to enhance the performance of formal verification engines.

In some cases, assume-guarantee abstractions may be applied. Assume-guarantee abstractions can require additional effort to validate.

Combinational equivalence checking (CEC) may be used to formally prove that two representations of an electronic design are equivalent. In CEC, combinatorial logic between two sequential elements can be considered. However, sometimes there may exist two representations of an electronic design which are different at the combinational level and yet produce the same outputs when given the same inputs. For example, a particular design may include clock gating, which is a popular technique for power saving in electronic chips. Clock gating can cause idle electronic components in an electronic chip to be shut off so as to, for example, reduce power consumption of the chip. In this example, this particular design may be represented by two different representations, one which includes clock gating and one which does not. These two representations of the design may be declared as non-equivalent in CEC because clock gating can reduce power consumption and typically does not cause changes to the outputs per given inputs, although in terms of functionality they are equivalent. Therefore, as can be seen, a typical CEC process can lead to an erroneous declaration of non-equivalence of two electronic design representations, when, in fact, the two representations are equivalent.

Sequential equivalence checking (SEC) process is a compositional verification technique commonly used in electronic design automation (EDA), commonly used during the development of digital integrated circuits. SEC can be used to formally prove that two representations of a circuit design under test (DUT) exhibit the same behavior, using formal verification. This process typically involves assuming equivalence of the DUT inputs and/or proving or disproving equivalence of the DUT outputs.

SEC typically involves finding pairs of internal candidate points that are potentially equivalent in two representations of the DUT e.g., these points are sometimes referred to as mapping pairs, or as cutpoints), thereby creating abstractions (e.g., abstracted environments). The abstractions may be parts of the entire DUT. Starting off a formal validation proof from each of these cutpoints and using an assume-guarantee (AG) proof that assumes the equivalence of the cutpoints, the validation process to formally prove the equivalence of the abstracted environments (e.g., the corresponding parts of the two representations) may be performed in parallel.

Abstractions typically have the potential to significantly reduce the verification task to smaller tasks, which may be easier and faster to complete. Such abstractions are typically sound but not complete. For example, a successful proof on the abstracted representation is typically valid in the unabstracted representation, but failure of the proof, in the abstracted representation, may not necessarily be present in the unabstracted representation. Disproved mapping pairs (disproved mapping pairs are hereinafter also referred to as failed mapping pairs or failures on mapping pairs or simply failures) may be discarded from the abstracted representations, creating new abstracted representations, from which the failed cutpoints that are removed, and the new representations undergo a repeated formal verification proof. The process of finding failed cutpoints, removing them from the abstracted representations and repeating the proof until all remaining abstractions are proven may be very long and require substantial computing resources until the two representations of the DUT are determined to be equivalent.

A failed mapping pair may typically be detected by identifying respective DUT signals (e.g., of the two representations) that demonstrate mismatched values between the two points of the mapping pair. Each DUT signal is typically referred to as a "trace" and the number of clock cycles in a trace is generally referred to as the trace length. Each of the clock cycles in a trace can be represented as a set of tracked values.

Typically, when performing SEC, in some instances, it may not be necessary to verify the equivalence of all internal parts within the two representations of the DUT. A typical goal in SEC is to determine that when external inputs (respective inputs into the two representations of the DUT) are assumed to be equivalent, external outputs (respective outputs of the two representations of the DUT) can be proven to be equivalent too. In some instances, internal respective parts in the two representations of the DUT may be the subject of SEC, where, in such instances, the inputs to an internal part of the DUT may be treated as outputs of a preceding part in the DUT, and the outputs of that internal part may be treated as inputs to the next part.

As a DUT typically includes many components that are to be proven, a convergence time (e.g., the time required to complete the proof over the entire DUT or the time needed to decide to stop and move on) of a SEC process to be very long. One way to shorten the SEC process time for DUTs with many components is to choose helper cutpoints (e.g., pairs of corresponding points in the two representations of the DUT). An assertion can be made that each cutpoints is equivalent. Based on that assertion, the EDA tool may concurrently perform SEC processes starting from cutpoints that are yet to be proven as equivalent and which are assumed as such. This assertion is typically referred to as AG assertion. Making AG assertions on the equivalence of cutpoints typically increases the overall efficiency of the SEC technique, as instead of completing proofs serially parallel proofs may be executed.

Typically, the entire results of the SEC process that are based on a failed equivalence assertion are discarded, and the entire process may need to be repeated. In repeating the process, the pair of cutpoints that are not equivalent are discarded. However, this can cause the SEC process to have to be run twice, thus eliminating any time savings the assertion gave.

It may be desirable to further explore failed cutpoints by extending formal proof beyond the failed cutpoint.

SUMMARY OF THE INVENTION

There is thus provided, according to some embodiments of the present invention, a method for sequential equivalence checking (SEC) of two representations of an electronic circuit designs. The method includes using a processor, automatically selecting a plurality of cutpoint in the two representations of the electronic design; using a processor, automatically executing a prove-from strategy on the plurality of cut point to identify a failed cutpoint in the two representations of the electronic design; and using the processor, automatically extending a trace corresponding to the identified failed cutpoint to identify a deeper failed cut point pair or a failed output pair in the two representations of the electronic design.

In some embodiments of the invention, the trace is extended from a predetermined number of cycles preceding the failed cutpoint.

In some embodiments of the invention, the predetermined number is not greater than 5.

In some embodiments of the invention, the predetermined number is not greater than 2.

In some embodiments of the invention, the method further includes selecting the trace from a set of saved traces.

In some embodiments of the invention, the method further includes selecting the trace based on prioritizing rules.

In some embodiments of the invention, the prioritizing rules are selected from the group of rules consisting of giving higher priority to traces that were not used in a previous iteration, giving higher priority to traces relating to output pairs over traces relating to internal cutpoints, giving higher priority to traces longer than a predetermined length and giving higher priority to traces with high number of incidental identified failures.

In some embodiments of the invention, the method further includes selecting the trace using machine learning.

There is also provided, according to some embodiments of the present invention, a system for sequential equivalence checking (SEC) of two representations of an electronic circuit design. The system includes memory and a processor configured to: automatically execute a prove-from strategy on the plurality of selected cutpoints to identify a failed cutpoint in the two representations of the electronic design; and automatically extend a trace corresponding to the identified failed cutpoint to identify a deeper failed cutpoint or a failed output pair in the two representations of the electronic design.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

Figure 1:
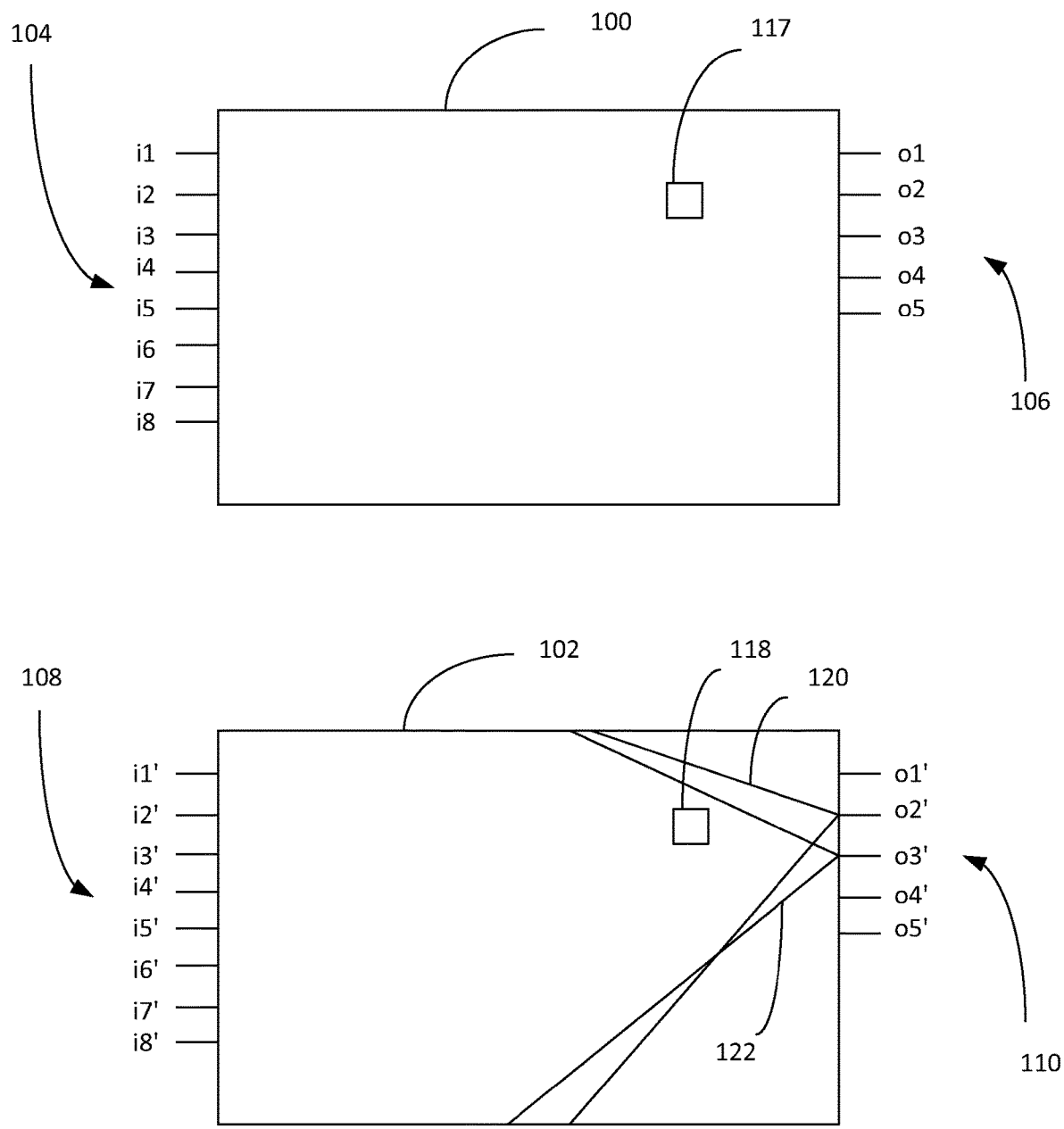
FIG. 1 is a schematic illustration of two representations of an electronic design for which it is desired to determine whether the two representations of the electronic design are equivalent, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Some embodiments of the present invention are aimed at reducing the convergence time (time needed for the solution to converge, or for the verification expert to decide to sign-off) of SEC processes by involving cutpoint strategy and combining it with "prove-from" strategy, by using failure extension (FE) technique. According to some embodiments of the invention, in FE, instead of discarding a trace leading to failed cutpoints, removing the failed cutpoints from the two representations of the electronic design and starting a new formal verification proof on the representations of the electronic design, such trace may be used to deeper explore abstracted environments extending from the failed cutpoints. By extending the formal proof beyond the failed cutpoints, it may be possible to find additional failed cutpoints and remove these additional failed cutpoints from the two representations of the electronic design, rather than start over each time a failed cutpoint is found, time and computer resources may be saved. In some instances of EF failed output pairs of the unabstracted environment (the actual outputs of the compared DUTs) may be detected.

While traces to failed cutpoints may not be useful for proving the equivalence of output pairs of the electronic design, traces to failed cutpoints may be extended to find more failed output pairs. In FE, traces to failed cutpoints (sometimes referred to as "from traces") may be used as starting points for performing a formal verification proof algorithm, in order to obtain deeper traces and possibly identify more failed cutpoints. According to some embodiments of the invention the signals at the failed cutpoints, which are recorded in the traces are used as a starting point for a formal verification proof. In some embodiments of the present invention the signals in the traces relating to failed cutpoints may be used in the formal verification proof starting a few steps (e.g., a few clock cycles) before the failed cutpoints (the part of the trace leading to each of the failed cutpoint being used as a prefix). In FE, according to some embodiments of the invention, an EDA may scan through traces that lead to cutpoints that were obtained during SEC, and deeper investigate these traces, aiming to identify additional failed cutpoints and possibly finding failed output pairs. Traces generated in a FE process that lead to additional cutpoints may also be used in a further FE to find further additional failed cutpoints. Finding an effective trace (e.g., a trace that is successfully used to find additional failed cutpoints) may greatly increase the efficiency of the SEC process.

For example, in Tool Command Language (TCL), a failure extension command (may also be referred to as "prove-from" command) may look like this:

prove-property p0-engine b-timelimit 3 h-from d1, where p0 is a property to be proven, b is a selected engine to perform this command, timelimit is the duration of time allowed for this task (after which the action will stop, e.g., 3 h is an example of a selected time limit of three hours), and d1 is the mapping pair property with its corresponding trace.

According to some embodiments of the invention, the trace leading to d1 may be used in FE from d1, with values relating to d1 in the trace used for setting an initial state for the formal prove starting from d1, going forward, in the electronic design.

FIG. 1 is a schematic illustration of two representations of an electronic design for which it is desired to determine whether the two representations of the electronic design are equivalent, according to some embodiments of the present invention.

For example, SEC may be used to prove or disprove that electronic design representation 100 is equivalent to electronic design representation 102. Specifically, it may be desired to prove (or disprove) that if inputs i1-i8 (104) are equivalent to inputs i1'-i8' (108), outputs o1-o5 (106) are equivalent to outputs o1'-o5' (110).

In many cases a DUT is a complex entity with a vast number of state elements, and this may lead to spending very long time in completing the SEC process. The time required to solve such problem may be related exponentially to the number of state elements, which may make the convergence time (time needed for the solution to converge, or for the verification expert to decide to sign-off) extremely long (perhaps much too long than accepted).

During the SEC process, traces containing signals at a plurality of state element locations within the DUTs (e.g., inputs, flops, logic gates, outputs, etc.) may be obtained and recorded. The traces are typically sequences of values sampled at state elements in sequential instances along a timeline typically representing clock cycles.

Cutpoint strategy (e.g., the use of cutpoints in SEC) is a prove-oriented strategy, certain assumptions are made, for which corresponding assertions may then be proved. Because of the prove-oriented nature of cutpoints strategy, it typically exhibits low performance in identifying failures (counter examples—CEXs).

According to some embodiments of the present invention, SEC may be automatically performed by an EDA tool, which automatically employs cutpoint strategy. In some embodiments of the present invention, a plurality of cutpoints may be selected (e.g., by a processor) inside the representations of the DUT during sequential equivalence checking performed on the two representations.

Typically, cutpoints may be placed at corresponding flip-flops, however cutpoints may also be placed at other corresponding locations on signals of the representations of the electronic design.

In some cases, the aim in SEC is to prove that all outputs of the two representations of the DUT are equivalent or find at least one signal pair of corresponding outputs that is not equivalent. For the latter to exist it is enough to show one CEX that disproves the assertion that all outputs are equivalent. In other cases, the aim in SEC is to prove (or disprove) that a portion or some portions (e.g., an internal part in the design) of the design are equivalent.

Finding an internal failure indicative on non-equivalent cutpoint within the two representations of the electronic design may not necessarily imply that there exist one or more pairs of corresponding outputs that are not equivalent. However, according to some embodiments of the present invention, it may be prudent to further explore that internal failure as a good starting lead in tracking down output inequivalence.

Figures 2, 3:
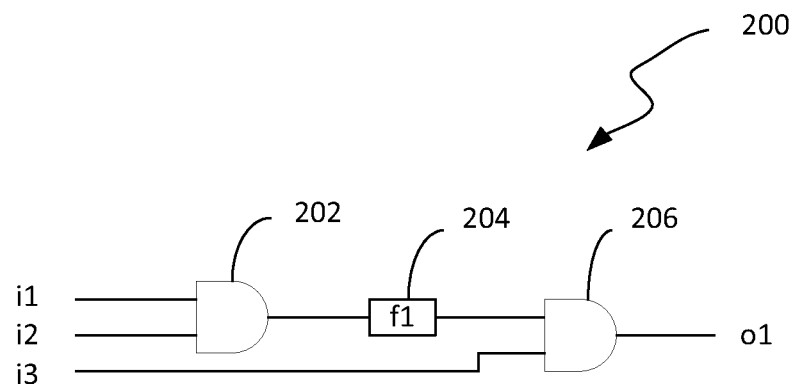
FIG. 2 is a schematic logic gating representation of a component of an electronic design, which may be subjected to a sequential equivalence checking according to some embodiments of the present invention.
FIG. 3 is a table representing trace signal values for the logic gating representation of the electronic component shown in FIG. 2.

FIG. 2 is a schematic logic gating representation of a component of an electronic design, which may be subjected, when represented by two abstracted representations of an electronic design to a sequential equivalence checking according to some embodiments of the present invention.

In the example shown in FIG. 2 logic gating representation 200 of the component of an electronic design includes three inputs, i1, i2 and i3, an AND gate 202 which is fed directly signals from inputs i1 and i2, a flip-flop element 204 directly fed from AND gate 202 and feeding a second AND gate 206, which is also directly fed from input i3. AND gate 206 outputs a signal to output o1.

FIG. 3 is a table representing trace signal values for the logic gating representation of the electronic component shown in FIG. 2. Each column of the table represents a step (vector) of the signal trace.

Component 200 (see FIG. 2) may receive a reset command (resetting, inter-alia, flip-flop element 204). The inputs—i1-i3—of component 200 may obtain in step 0 an initial set of signals as follows: i1=1, i2=1 and i3=0. AND gate 202 outputs 1, however the value of f1 (flip-flop element 204) is 0 (due to the reset command), AND gate 206 outputs 0 and output o1 is x (undefined yet).

At the next, second, step of the signal trace i1, i2 and i3 get, each 0, flip-flop element 204 outputs 1 (a stored value form the previous step) and output o1 gets 0 as the output of AND gate 206.

At a third step of the signal trace inputs i1, i2 and i3 get 1, flip-flop element 204 outputs 0 and output o1 gets 0 output from AND gate 206. According to some embodiments of the present invention, an EDA tool may be designed to automatically perform sequential equivalence checking of two representations of an electronic design which includes automatically selecting a plurality of cutpoints in the two representations of the electronic design (e.g., pair 117 and 118 in designs 100 and 102, respectively), and automatically performing sequential equivalence, by performing a formal verification proof on the two representations of the design with the cutpoints to identify a failed cutpoint indicating non-equivalence of that cutpoint in the two representations of the electronic designs.

The identified failed cutpoint may be used as a starting point for further investigation that may lead to identifying deeper failed cutpoints, and even lead to identifying a failure in any of the outputs of the checked designs, as the cone of influence (COI) of a failed cutpoint may likely overlap, at least partially, the COI of one or more outputs of the designs undergoing SEC, e.g., COI 120 and COI 122 in design 102.

According to some embodiments of the present invention, a set of signals of a signal trace attributed to the identified failure is applied and a formal verification proof is performed with the failed cutpoint as a starting point. The values from a trace obtained in the formal verification proof that resulted in identifying the failed cutpoint, or a trace obtained in a previous execution of a formal verification proof on the two representations of the electronic design are used to set an initial state for the formal verification proof extending from the failed cutpoint. Eventually extending the formal verification proof from the failed cutpoint may prove or disprove equivalence of one or a plurality outputs of the two representations of the electronic design.

Figure 4:
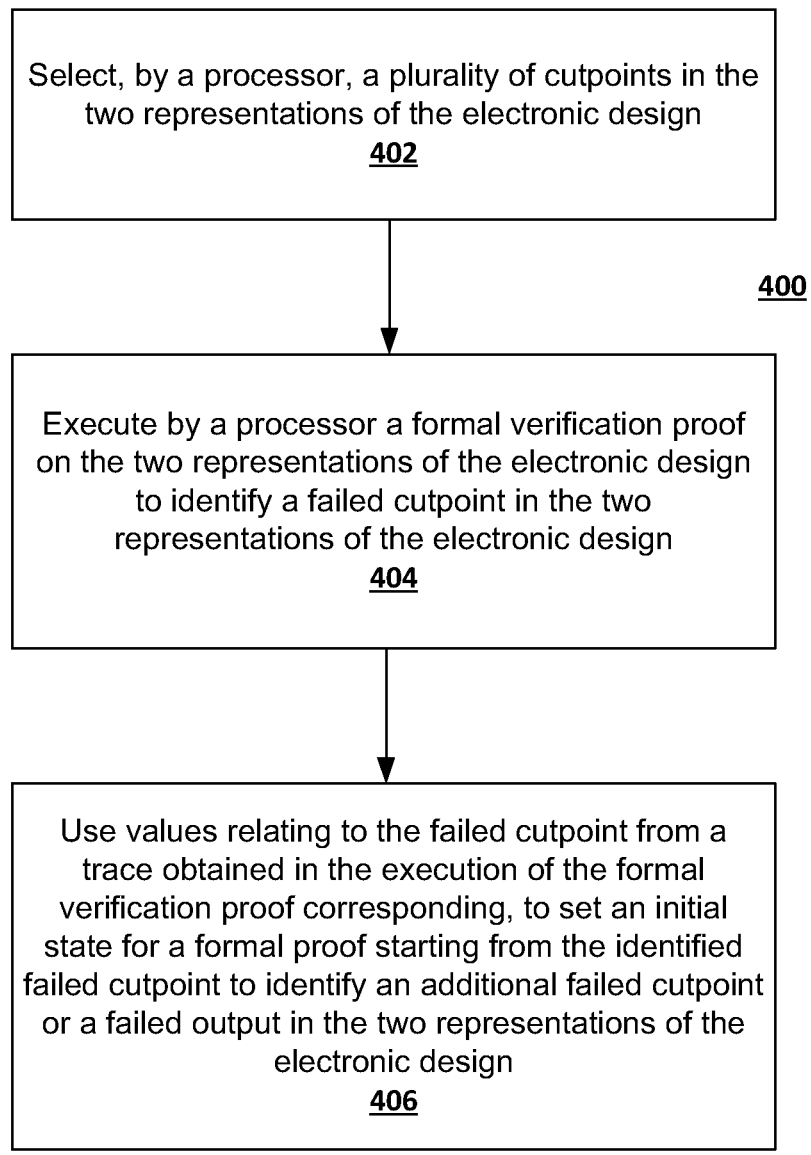
FIG. 4 is a block diagram showing a method for sequential equivalence checking, according to some embodiments of the invention.

FIG. 4 is a schematic flow diagram of a method 400 for sequential equivalence checking of two representations of an electronic design. Method 400 may include, selecting 402, by a processor, a plurality of cutpoints in the two representations of the electronic design.

Method 400 may also include executing 404 by a processor a formal verification proof on the two representations of the electronic design to identify a failed cutpoint in the two representations of the electronic design.

Method 400 may also include using 406 values relating to the failed cutpoint from a trace obtained in the execution of the formal verification proof corresponding, to set an initial state for a formal proof starting from the identified failed cutpoint to identify an additional failed cutpoint or a failed output in the two representations of the electronic design.

In some embodiments of the invention, the initial state is set using values from the trace at a location on the trace a predetermined number of steps before the failed cutpoint. For example, the predetermined number of steps may be selected to be not greater that a predetermined number (e.g., 5 or 2, etc.)

In some embodiments of the invention, the trace may be selected from a set of saved traces that were obtained in previous executions of SEC.

In some embodiments the trace may be selected based on prioritizing rules.

The selection of from-traces to be extended, according to some embodiments of the invention, can be done in various ways, for example, using static heuristics or machine learning techniques. The selection may be carried out using trace history, trace length, overlaps between traces, mapping pairs types, number of mapping pairs fail by same trace (incidentals), etc. The time invested in each trace is calculated adaptively.

In some embodiments of the present invention selection of the from-trace from a set of saved traces may involve using machine learning.

According to some embodiments of the present invention, it may be prudent to optimize the selection of a from-trace to expand. For example, one or more optimization rules for selecting a from-trace to expand, may include scanning through traces of runs that were recorded (e.g., saved in a database). Prioritizing a from-trace may include (1) giving higher priority to traces that were not used in a previous iteration of extending from-trace, according to some embodiments of the invention; (2) giving higher priority to from-traces relating to output mapping pairs over from-traces relating to internal mapping pairs; (3) giving higher priority to long traces; (4) giving higher priority to traces with high number of incidental identified failures.

The extended traces may be displayed on a display device for review by the user, they can be opened and used for debug purposes.

In some embodiments of the invention, the failed cutpoints in the two representations of the electronic design may be discarded and the two representations of the electronic design (now without the discarded cutpoints) may be subjected to another iteration of the SEC process, according to some embodiments of the invention.

Figure 5:
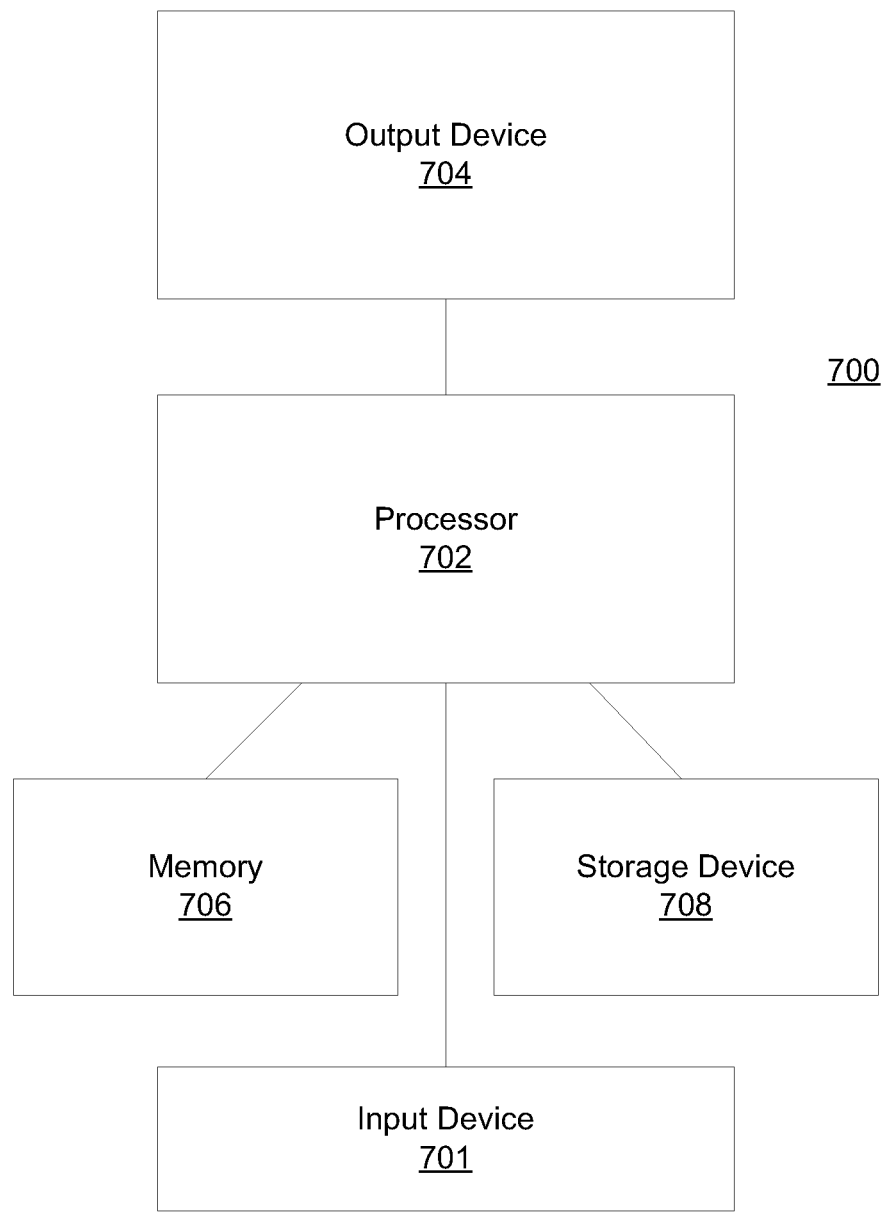
FIG. 5 is a system for sequential equivalence checking according to some embodiments of the present invention.

FIG. 5 shows a system for sequential equivalence checking of two representations of the electronic design, according to some embodiments of the present invention. System 700 may include a processor 702 (e.g. single processor or a processing unit made that includes a plurality of processors, on a single machine or distributed on a plurality of machines) for executing a method according to some embodiments of the present invention. Processing unit 702 may be configured to perform a method according to some embodiments of the invention and perform other actions and processing according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED, OLED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for sequential equivalence checking (SEC) of two representations of an electronic design, the method comprising:
   selecting, by a processor, a plurality of cutpoints in the two representations of the electronic design;
   executing by a processor a formal verification proof on the two representations of the electronic design to identify a failed cutpoint in the two representations of the electronic design; and
   identifying an additional failed cutpoint in the two representations of the electronic design by setting an initial state for a formal proof at the identified failed cutpoint using values sampled in sequential clock cycles from a trace obtained at the identified failed cutpoint in the execution of the formal verification proof.

2. The method of claim 1, wherein the initial state is set using values from the trace a predetermined number of steps before the failed cutpoint.

3. The method of claim 2, wherein the predetermined number is not greater than 5.

4. The method of claim 2, wherein the predetermined number is not greater than 2.

5. The method of claim 1, further comprising selecting the trace from a set of saved traces.

6. The method of claim 5, further comprising selecting the trace based on prioritizing rules.

7. The method of claim 6, wherein the prioritizing rules are selected from the group of rules consisting of giving higher priority to traces that were not used in a previous iteration, giving higher priority to traces relating to output pairs over traces relating to internal cutpoints, giving higher priority to traces longer than a predetermined length and giving higher priority to traces with high number of incidental identified failures.

8. The method of claim 5, further comprising selecting the trace using machine learning.

9. A system for sequential equivalence checking (SEC) of two representations of an electronic design, the system comprising:
   a memory; and
   a processor configured to:
   select a plurality of cutpoints in the two representations of the electronic design;
   execute a formal verification proof on the two representations of the electronic design to identify a failed cutpoint in the two representations of the electronic design;
   select a trace from a set of saved traces obtained in the previous execution of the formal verification proof; and
   identify an additional failed cutpoint in the two representations of the electronic design by setting an initial state for a formal proof at the identified failed cutpoint using values sampled in sequential clock cycles from a trace obtained at the identified failed cutpoint in the execution of the formal verification proof.

10. The system of claim 9, wherein the processor is configured to set the initial state using values from the trace a predetermined number of steps before the failed cutpoint.

11. The system of claim 10, wherein the predetermined number is not greater than 5.

12. The system of claim 11, wherein the processor is configured to select the trace based on prioritizing rules.

13. The system of claim 12, wherein the prioritizing rules are selected from the group of rules consisting of giving higher priority to traces that were not used in a previous iteration, giving higher priority to traces relating to output pairs over traces relating to internal cutpoints, giving higher priority to traces longer than a predetermined length and giving higher priority to traces with high number of incidental identified failures.

14. The system of claim 11, wherein the processor is configured to select the trace using machine learning.

15. The system of claim 10, wherein the predetermined number is not greater than 2.

16. A non-transitory computer readable storage medium for sequential equivalence checking of two representations of an electronic design, having stored thereon instructions that when executed by a processor will cause the processor to:
   select a plurality of cutpoints in the two representations of the electronic design;
   execute a formal verification proof on the two representations of the electronic design to identify a failed cutpoint in the two representations of the electronic design;
   select a trace from a set of saved traces obtained in the previous execution of the formal verification proof based on prioritizing rules; and
   identify an additional failed cutpoint in the two representations of the electronic design by setting an initial state for a formal proof at the identified failed cutpoint using values sampled in sequential clock cycles from a trace obtained at the identified failed cutpoint in the execution of the formal verification proof.

17. The non-transitory computer readable storage medium of claim 16, having stored thereon instructions that when executed by a processor will cause the processor to set the initial state using values from the trace a predetermined number of steps before the failed cutpoint.

18. The non-transitory computer readable storage medium of claim 16, wherein the prioritizing rules are selected from the group of rules consisting of giving higher priority to traces that were not used in a previous iteration, giving higher priority to traces relating to output pairs over traces relating to internal cutpoints, giving higher priority to traces longer than a predetermined length and giving higher priority to traces with high number of incidental identified failures.

19. The non-transitory computer readable storage medium of claim 16, having stored thereon instructions that when executed by a processor will cause the processor to select the trace using machine learning.

* * * * *